(12) United States Patent
Milne et al.

(10) Patent No.: US 7,203,632 B2
(45) Date of Patent: Apr. 10, 2007

(54) HDL CO-SIMULATION IN A HIGH-LEVEL MODELING SYSTEM

(75) Inventors: Roger B. Milne, Boulder, CO (US); L. James Hwang, Menlo Park, CA (US); Jeffrey D. Stroomer, Lafayette, CO (US); Nabeel Shirazi, San Jose, CA (US); Haibing Ma, Superior, CO (US); Jonathan B. Ballagh, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 579 days.

(21) Appl. No.: 10/389,161

(22) Filed: Mar. 14, 2003

(65) Prior Publication Data
US 2004/0181385 A1    Sep. 16, 2004

(51) Int. Cl.
*G06F 17/50* (2006.01)

(52) U.S. Cl. .................... 703/14; 716/19; 716/18; 716/4; 716/5; 716/6; 703/13; 703/15; 703/17; 703/19

(58) Field of Classification Search ............... 703/15, 703/13, 14; 716/19
See application file for complete search history.

(56) References Cited

U.S. PATENT DOCUMENTS

| 5,910,897 A | * | 6/1999 | Dangelo et al. ............ 716/19 |
| 5,933,356 A | * | 8/1999 | Rostoker et al. ............ 703/15 |
| 7,110,935 B1 | | 9/2006 | Hwang et al. |
| 2002/0049576 A1 | * | 4/2002 | Meyer ...................... 703/14 |
| 2003/0191615 A1 | * | 10/2003 | Bailey et al. ............... 703/13 |

FOREIGN PATENT DOCUMENTS

EP        1 059 593 A    12/2000

OTHER PUBLICATIONS

Perakath Benjamin, Timothy O'Brien□□A Model-Based Approach for Component Simulation Development□□Proceedings of the 2000 Winter Simulation Conference, pp. 1831-1839.*

Heneault et al□□A Fast Hardware Co-Specification and Co-Simulation MethodologyIntegrated in a H/S Co-Design Platform□□The 13th International Conference on Microelectronics, Rabat, Moroco, Oct. 29-31, 2001.*

(Continued)

*Primary Examiner*—Kamini Shah
*Assistant Examiner*—Cuong Van Luu
(74) *Attorney, Agent, or Firm*—LeRoy D. Maunu

(57) ABSTRACT

Method and apparatus for simulating operations of a circuit design that includes high-level components and HDL components. The high-level components of the design are simulated in a high-level modeling system (HLMS), and the HDL components of the design are simulated with an HDL simulator. Data values are converted from a data type of the HLMS to a logic vector compatible with the HDL simulator for each data value to be input to the HDL simulator, and a logic vector is converted from the HDL simulator to a data value of a data type compatible with the HLMS for each logic vector output from the HDL simulator. Events are scheduled for input to the HDL simulator as a function of the time of HLMS events and a maximum response time of the HDL components.

22 Claims, 6 Drawing Sheets

OTHER PUBLICATIONS

Robert Siegmund, Dietmar Muller☐☐SystemC: An Extension of SystemC for Mixed Multi-Level CommunicationModeling and Interface-Based System Design☐☐0-7695-0993-Feb. 2001 IEEE.*
Kim et al☐☐Virtual Synchronization for Fast Distributed Cosimulation of Dataflow Task Graphs☐☐ISS'02 Oct. 2-4, 2002, Kyoto, Japan☐☐2002 ACM 1-58113-576-9/02/0010.*
Benoit A. Gennart☐☐Comparative Design Calidation Based on Event Pattern Mappings☐☐30th ACM/IEEE Design Automation Conference☐☐1993 ACM 0-89791-577-1/93/0006-0373.*
Serge Maginot☐☐Evaluation Criteria of HDLs: VHDL Compared to Verilog, UDL/I & M☐☐0-8186-2780-8/92 1992 IEEE.*
Cary Ussery et al.; "HDL and Integrating System-Level Simulation Technologies"; IEEE 1997; pp. 91-97.
Agilent Technologies; "Advanced Design System 2002—HDL Cosimulation"; Feb. 2002; pp. 1-1 through 1-14.
Stuart Swan; "An Introduction to System Level Modeling in SystemC 2.0"; 2001 Open SystemC Initiative (OSCI); pp. 1-10.
U.S. Appl. No. 10/388,681, filed Mar. 14, 2003, Milne et al.
U.S. Appl. No. 10/388,936, filed Mar. 14, 2003, Milne et al.
U.S. Appl. No. 10/389,368, filed Mar. 14, 2003, Ma et al.
C. Valderrama et al.; "Automatic VHDL-C Interface Generation for Distribution Cosimulation: Application to Large Design Examples"; Design Automation for Embedded Systems; vol. 3, No. 2-3; Copyright 1998 Kluwer Academic Publishers; Mar. 1998; pp. 199-216.
C. A. Valderrama et al.; "Automatic Generation of Interfaces for Distributed C-VHDL Cosimulation of Embedded Systems: an Industrial Experience": Rapid System Prototyping; Proceedings of the Seventh IEEE International Workshop on Thessaloniki, Greece; Jun. 19-21, 1996; pp. 72-77.
Jay Lawrence et al.; "INCA: A Next-Generation Architecture for Simulation"; Verilog HDL Conference Proceedings; Feb. 26-28, 1996; 1996 IEEE International; pp. 12-16.
Sungioo Yoo et al.; "A Generic Wrapper Architecture for Multi-Processor SoC Cosimulation and Design"; Proceedings of the 9th International Workshop on Hardware/Software Codesign Codes; Apr. 25-27, 2001; pp. 195-200.
Heiko Hubert; "A Survey of HW/SW Cosimulation Techniques and Tools"; Royal Institute of Technology; Jun. 1998; pp. 1-48.

* cited by examiner

```
1    entity clkdriver is
2        port (
3            clk : out std_logic := '0';
4            ce2 : out std_logic := '0';
5            ce4 : out std_logic := '0');
6    end clkdriver;

7    architecture behavior of clkdriver is
8        constant half_T1 : time := 0.5 sec;
9        signal proto_clk : std_logic := '1';
10       signal proto_ce2 : std_logic := '1';
11       signal proto_ce4 : std_logic := '1';
12   begin 13       Process_proto_clk : process (proto_clk)
14       begin
15           if (proto_clk='0') then
16              proto_clk <= '1' after (1 * half_T1);
17           else
18              proto_clk <= '0' after (1 * half_T1);
19           end if;
20       end process Process_proto_clk;

21       Process_proto_ce2 : process (proto_ce2)
22       begin
23           if (proto_ce2='0') then
24              proto_ce2 <= '1' after (2 * half_T1);
25           else
26              proto_ce2 <= '0' after (2 * half_T1);
27           end if;
28       end process Process_proto_ce2;

29       Process_proto_ce4 : process (proto_ce4)
30       begin
31           if (proto_ce4='0') then
32              proto_ce4 <= '1' after (6 * half_T1);
33           else
34              proto_ce4 <= '0' after (2 * half_T1);
35           end if;
36       end process Process_proto_ce4;

37       clk <= transport proto_clk after (1.99 * half_T1);
38       ce2 <= transport proto_ce2 after (2.00 * half_T1);
39       ce4 <= transport proto_ce4 after (6.00 * half_T1);

40   end behavior;
```

FIG. 5

HDL CO-SIMULATION IN A HIGH-LEVEL MODELING SYSTEM

FIELD OF THE INVENTION

The present invention relates to co-simulating HDL components in a high-level modeling system.

BACKGROUND

A high level modeling system (HLMS) is a software tool in which electronic designs can be described, simulated, and translated by machine into a design realization. An HLMS provides a higher level of abstraction for describing an electronic circuit than a hardware description language (HDL) simulation environment such as the ModelSim environment from the Model Technology company. An HLMS generally provides a mathematical representation of signals as compared to standard logic vectors in a hardware description language (HDL). It is desirable for the high-level abstractions to be precisely correlated with the ultimate implementation representation, both in simulation semantics and in implementation. The Xilinx System Generator tool for DSP and the MathWorks' Simulink and MATLAB environments are example HLMS's in which such capabilities are desirable.

An HLMS for electronic circuit design generally offers abstractions that are not available in traditional HDLs. For example, an HLMS is likely to offer abstractions that relate to signal propagation and signal state, while an HDL may support a detailed representation that more closely models a realized electronic circuit. An electronic design modeled in an HLMS may be viewed as a collection of components that communicate through signals. Signals are discrete, time-varying sequences of values. An HLMS generally provides abstractions to support implementing synchronous designs without requiring the specification of explicit references to clocks or clock signals. Instead of providing a detailed, event driven simulation, an HLMS may also provide abstractions wherein clock-synchronous state changes are scheduled to occur at regular intervals and in which there is no notion of the timing characteristics related to the intended implementation as an electronic circuit. In further support of creating high-level designs, an HLMS may also represent state in terms of numerical (or other abstract) values instead of representing state in a detailed format analogous to standard logic vectors.

An HDL generally supports the detailed specification of timing characteristics and multi-valued signal states for a circuit. Example timing characteristics include propagation delays, setup times, and hold times, and example signal states include the standard binary logic types as well as strongly and weakly-driven states, a transitional state, an unknown state, and an uninitialized state. HDL simulators generally are capable of modeling such systems, which affects both the way events are handled (times at which signal states change) and the way the system state is presented at any given time. HDL simulations are typically event driven and require system inputs or outputs to be specified in terms of a standard extended type (e.g., the standard logic vectors of VHDL/IEEE 1164).

In an HLMS-based design, there may be some components that are described in an HDL. It is often desirable to simulate the HDL components while simulating the HLMS-based design. The process of incorporating an HDL simulation into an HLMS-based simulation is referred to as co-simulation. To effectively simulate both the high-level components and the HDL components, it would desirable to minimize the impact of disparities between the data types supported by the HLMS and the possible signal states supported by the HDL simulator and provide realistic timing relationships between the HLMS and the HDL simulator.

A method and an apparatus that address the aforementioned problems, as well as other related problems, are therefore desirable.

SUMMARY OF THE INVENTION

The various embodiments of the invention provide methods and apparatus for simulating operations of a circuit design that includes high-level components and HDL components. The high-level components of the design are simulated in a high-level modeling system (HLMS), and the HDL components of the design are simulated with an HDL simulator. Data values are converted from a data type of the HLMS to a logic vector compatible with the HDL simulator for each data value to be input to the HDL simulator, and a logic vector is converted from the HDL simulator to a data value of a data type compatible with the HLMS for each logic vector output from the HDL simulator. Events are scheduled for input to the HDL simulator as a function of a time of at least one HLMS event and a maximum response time of at least one HDL component.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which:

FIG. 4-1 illustrates a process flow in scheduling simulation events between the HLMS and the HDL simulator;

FIG. 4-2 shows examples of a HLMS timeline and a HDL timeline;

FIG. 4-3 is an example of a HLMS having a HDL component connected to a HLMS component; and FIG. 5 illustrates HDL for an example clock signal generator.

DETAILED DESCRIPTION

The various embodiments of the invention provide an interface for co-simulation of HDL components in a high-level modeling system (HLMS). The interface handles differences between the HLMS and an HDL simulator in the ways in which data are represented and differences in the scheduling of temporal events. In addition to translating between data formats for compatible data types, the HLMS coordinates the scheduling of events to the HDL simulator as a function of the data rate of the high-level design and the response time of the HDL component(s). In another embodiment, an additional state is introduced for use with data types used by the high-level components. The additional state is referred to herein as a "non-representable" state. A logic vector from the HDL simulator that is representable as or compatible with an HLMS data type is considered to be representable in the HLMS. A logic vector from the HDL simulator having a state that is incompatible with HLMS data types is non-representable. A logic vector from the HDL simulator that is representable is translated to an HLMS data value. For a logic vector from the HDL simulator that is non-representable, the state of the HLMS variable to which the logic vector is to be output is set to non-representable. The HLMS then propagates the non-representable state in operations performed on the variable.

Figure 1:
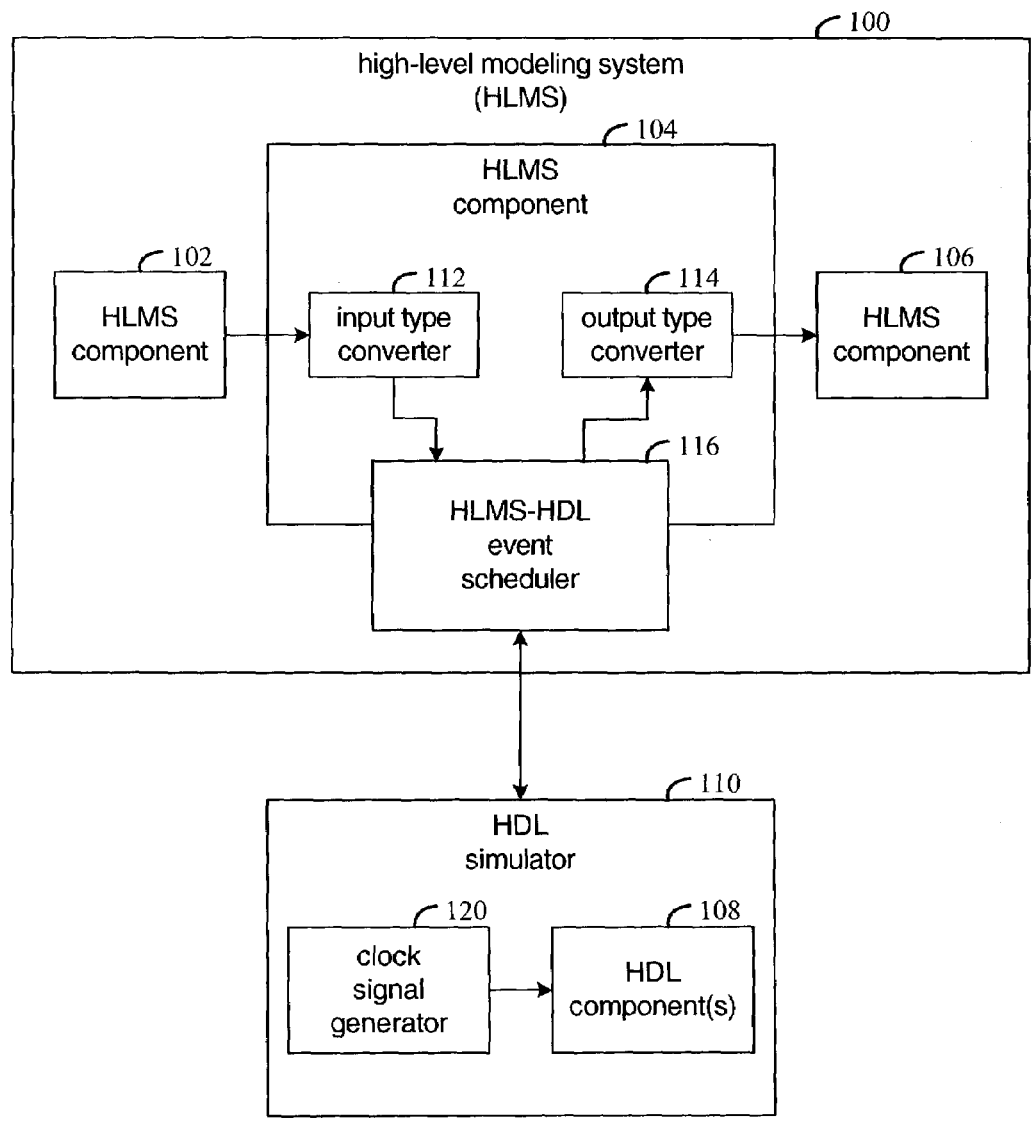
FIG. 1 is a functional block diagram of an arrangement for co-simulation of one or more HDL components in a high-level modeling system (HLMS)

FIG. 1 is a functional block diagram of an arrangement for co-simulation of one or more HDL components in a high-level modeling system (HLMS). With high-level modeling system 100, electronic circuit designs can be described and simulated. Some HLMS's further support machine translation of the high-level representation to a hardware design realization. An example HLMS is the System Generator for DSP environment from Xilinx.

An example design, or a portion of a design, is illustrated with HLMS components 102, 104, and 106. Output data from component 102 are input to component 104, and output data from component 104 are input to component 106. HLMS component 104 is instantiated as a high-level component in the HLMS, with the functionality of the component specified in HDL, for example as HDL component 108. In one embodiment, the designer creates HLMS component 104 and associates the HLMS component with an HDL definition. The designer also specifies the input and output characteristics of the HLMS component, for example, relative to components 102 and 106. Example input and output characteristics include data types, formats, and a data rate.

When the designer creates a high-level component such as component 104, the HLMS 100 creates type converters 108 and 110 for the high-level component and links the component to an event scheduler 116. The type converters and event scheduler are used during simulation to translate data formats and coordinate event scheduling between the HLMS and the HDL simulator 110. The HLMS also creates a clock signal generator 120 for use with the HDL component during simulation.

The HLMS 100 supports simulation of the design in conjunction with HDL simulator 110. HLMS simulates high-level components 102 and 106, and HDL simulator 110 simulates the high-level component 104 as defined by the HDL component 108. Example HDL simulators include both software tools, such as the ModelSim simulator and hardware engines such as FPGA-based simulators. For hardware-based HDL simulators, the HLMS also creates HDL interface components for use with the HDL components.

In an example embodiment, co-simulation of HDL component 108 with high-level components 102, 104, and 106 is supported by type converters 112 and 114, and HLMS-HDL event scheduler 116. The type converters and event scheduler resolve between the HLMS and the HDL simulator differences that relate to representation of the state of a computation and scheduling of temporal events. Input type converter 112 converts input data from HLMS component 102 to a format compatible with HDL component 108 and HDL simulator 110. Output type converter 114 converts an output logic vector from HDL component 108 and HDL simulator 110 to a format compatible with HLMS component 106. While not shown, it will be appreciated that additional software and/or hardware layers provide communication between event scheduler 116 and HDL simulator 110.

To translate data types and formats between the HLMS and the HDL simulator, a mapping is used to specify how certain hardware signal states (from the HDL simulator) are to be translated to numerical values (or other high level representations) in the HLMS. In general, this is a mapping from logic vectors to data types in the HLMS, and in one embodiment the specific mapping is specified in the HLMS by a user and subject to control by the HLMS. Sequences of bits from the HDL simulator may be interpreted as signed or unsigned integers, enumerated states, fixed point or floating point real or complex data in the HLMS. Each signal traveling to or from the HDL simulator may be given a unique mapping, and each signal may be mapped to a unique data type in the HLMS.

To each data type used in the HLMS an additional state is added to represent all states of output logic vectors (from the HDL simulator) that are not representable in the HLMS. This state is referenced herein as the non-representable (NR) state. The functional blocks (the high-level components of the design) useable in the HLMS are adapted to operate on variables in the NR state. In general, NR states are propagated aggressively in the HLMS. For example, if either operand in a binary operation is NR, then the state of the result is set to NR. It will be appreciated that HLMS variables in the NR state will tend to remain in the NR state once the NR state is entered. The variable may be explicitly cleared to remove a variable from the NR state.

The NR state used in the embodiments of the present invention is different from mechanisms such as the not-a-number (NaN) or infinity (Inf) states in the IEEE floating point standards. These mechanisms are arithmetic in nature and are representable within an HLMS, e.g. in IEEE floating point arithmetic log(0)=−Inf, 1/0=Inf, and 0/0=NaN. The NR state denotes states that are not representable in the data type of the HLMS. Thus, the NR state supports a floating-point-based HLMS model that includes a HDL component performing standard, single-precision floating-point division. The HDL component could produce both the NaN state and the NR state. The NaN state is representable in an HLMS data type, for example, when presented with inputs that request computation of 0/0. An example use of the NR state is when initial output states from the HDL component that are represented in the HDL component as standard logic vector having the value "UUUU . . . UU".

Figure 2:
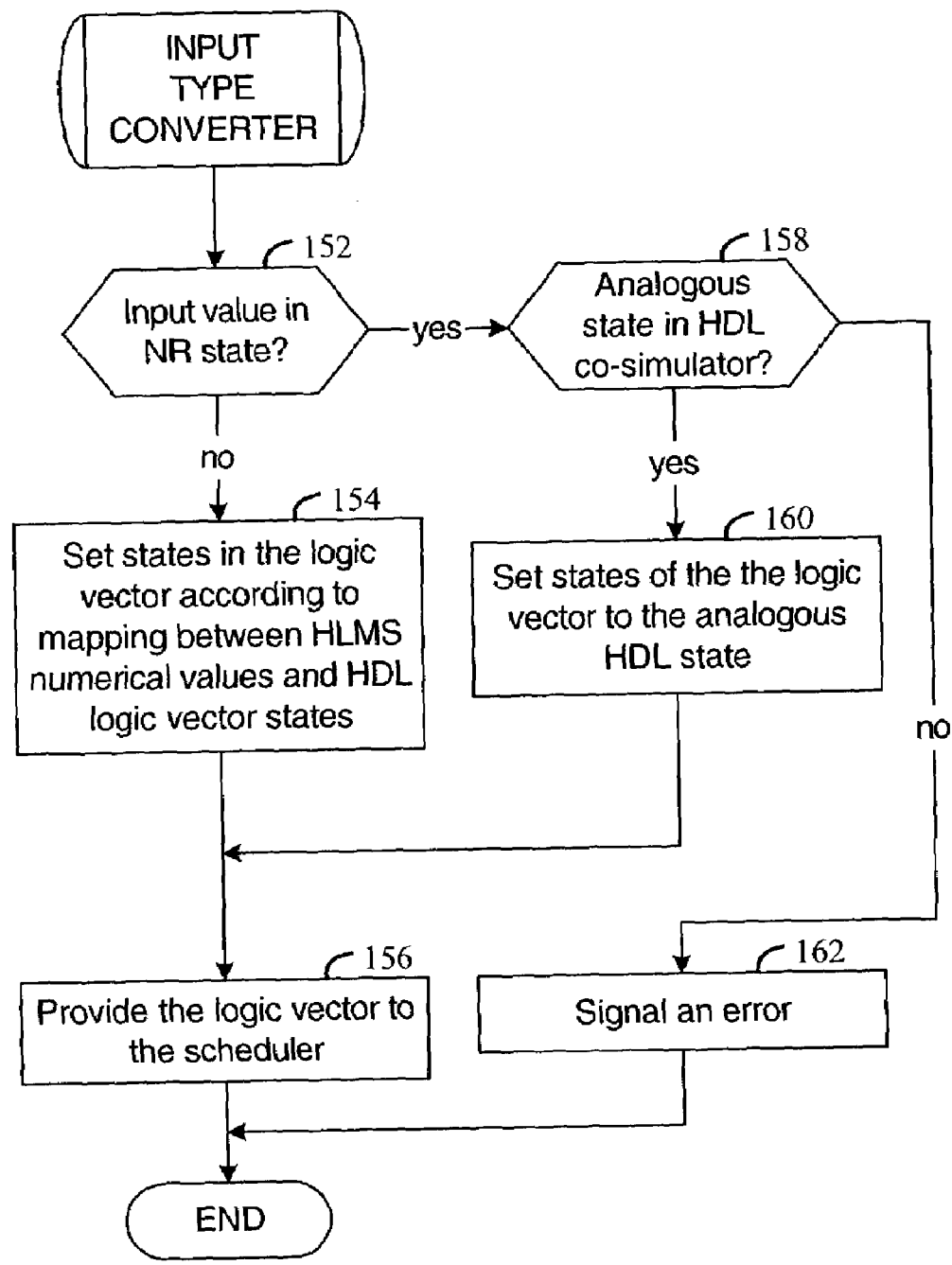
FIG. 2 is a flowchart of example logic for converting from a data value of the HLMS to a logic vector for input to an HDL simulator.

FIG. 2 is a flowchart of example logic for converting from a data value of the HLMS to a logic vector for input to an HDL simulator. All possible input values, except for NR (decision block 152) are mapped to vectors of strongly forced signal states (block 154). The logic vector is provided to the event scheduler for input to the HDL simulator (block 156). For an input variable in the NR state (decision block 152), the mapping is as follows. If the HDL simulator allows an input signal state analogous to the "X" state (forcing unknown) in the IEEE 1164 standard (block 158), then the logic vector corresponding to the NR input variable is driven with "XX . . . XX" (block 160). If the HDL simulator does not allow an input signal state analogous to the "X" state, then the HLMS signals an error (block 162). In one embodiment, the HLMS aborts the simulation when this type of error is signaled. Example HDL simulators that do not support the "X" state include simulators that use programmable logic devices to emulate the circuit described by the HDL component.

Figure 3:
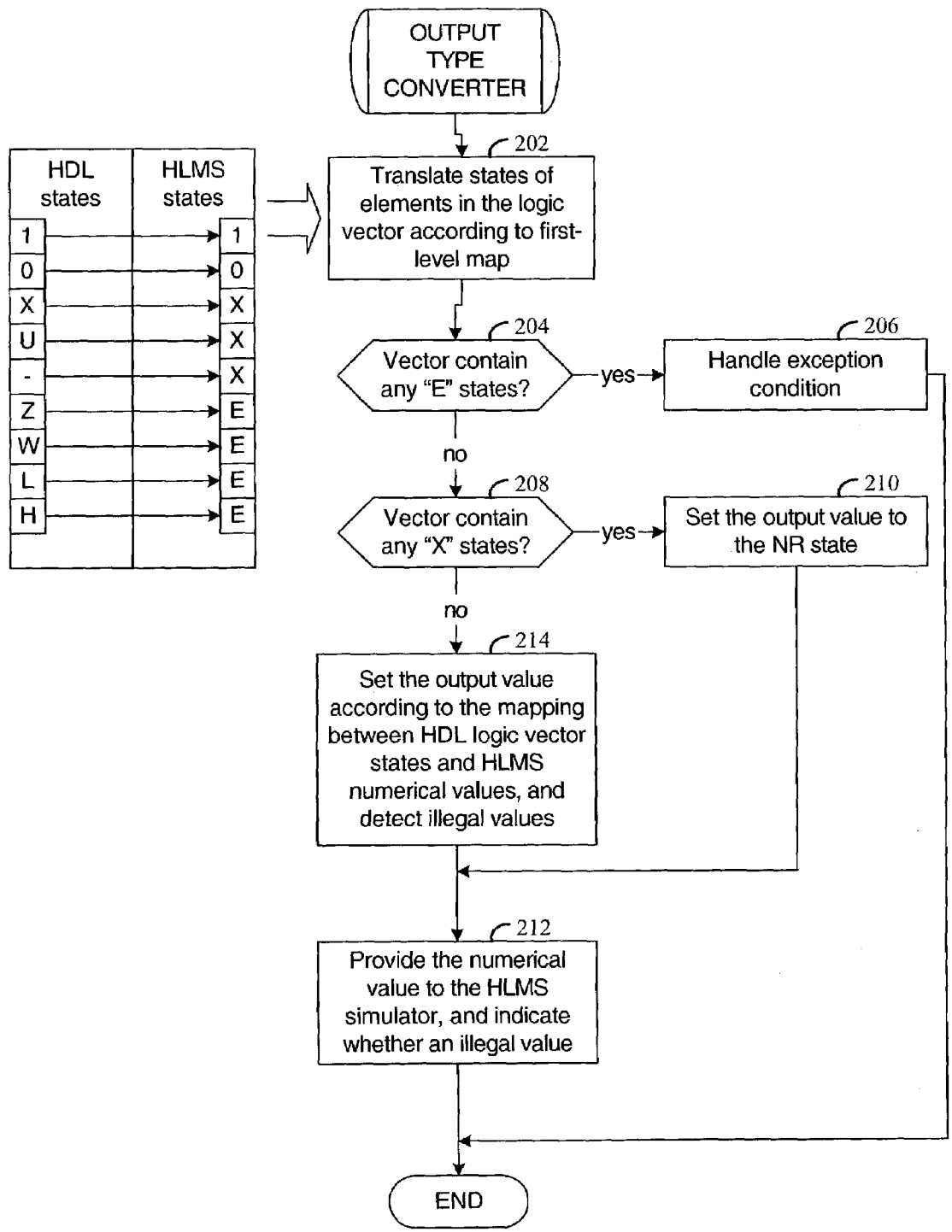
FIG. 3 is a flowchart that illustrates example logic for converting from a logic vector from an HDL simulator to a data value for the HLMS.

FIG. 3 is a flowchart that illustrates example logic for converting from a logic vector from an HDL simulator to a data value for the HLMS. The basic mapping from strongly forced logic signal vectors to HLMS data values remains unchanged but is extended to map all representable signals in the HDL simulation to representable values in the HLMS. This is accomplished with a two stage mapping. A 4-state logic type is defined with states "1" (forced high), "0" (forced low), "X" (forced unknown), and "E" (unsupported—requesting exception). A map is defined, for example, map 200, to map logic values from the domain of HDL-representable signal-vector states to states of the 4-state logic type. The states of the logic vector are translated to HLMS states (block 202) according to this map. The second stage of the mapping maps vectors of the 4-state logic type to an HLMS value. In one embodiment, the first map may be defined by the user.

The second stage of the mapping operates follows. If the vector contains any element in the "E" state (decision block 204), then the vector is not mapped into an HLMS data type and the HLMS handles the exception condition, for example, by aborting the simulation or asking the user how the exception should be handled (block 206). Otherwise, if the vector contains elements in the "X" state (decision block 208), then the output value to the HLMS is placed in the NR state (block 210). The output data value in the NR state is then provided to the HLMS (block 212). Where the logic vector contains only logic "1" and "0" the output value is set according to the implementation-specific translation of HDL logic vectors to HLMS data values (block 214). For example, sequences of bits may be interpreted as signed or unsigned integers, enumerated states, fixed or floating point values, complex numbers or other values. The translation of the logic vector also detects whether the vector is incompatible with the data types supported by the HLMS. The translated numerical data value is provided to the HLMS, along with an indicator if the value is illegal (block 212).

Default maps are also provided from standard HDL types. For example, for IEEE 1164 standard logic vectors, map 200 is the default map. In another embodiment, the user to may define alternative maps for mapping from HDL states to HLMS states and use the alternative maps in place of the default maps. In an example embodiment of alternative mapping, the top level HDL component is wrapped in a higher level component description. In this wrapper, standard logic types may be mapped in a way that achieves the desired behavior. An example map that treats weakly forced signals as strongly forced is shown in Example 1 below.

EXAMPLE 1

"1" --> "1"
"0" --> "0"
"X" --> "X"
"U" --> "U"
"–" --> "–"
"Z" --> "Z"
"W" --> "X"
"L" --> "0"
"H" --> "1"

The maps may act either element-by-element on a logic vector (as does the map above) or on a logic vector as a whole.

In support of co-simulation in the various embodiments of the invention, a maximum response time (MRT) is one of the factors used for scheduling events in the HDL simulator. If any input stimulus supplied to the HDL component at time $t_0$ and held constant for all time, regardless of the system state at time $t_0$, results in the output states of the HDL component being constant for all time after ($t_0$+T), then the maximum response time of the HDL component is T. The maximum response time may be determined by analyzing the HDL using known tools.

Some events have special significance to the HLMS and the HDL simulation. These events include clock and certain clock enable events that are related to the data propagation rates in the HLMS. Each of these event types is typically associated with signals that are implicit in the HLMS but in the HDL simulator must be provided as explicit signals. A HDL wrapper is automatically generated prior to simulation. The wrapper includes, for example, clock signal generator 120, which contains signal generators for the clock and clock-enable signals. The clock and clock-enable signals are distributed to the top-level component (e.g., 108).

The particular characteristics of the signal generators depend on the type of HDL simulator. For a software-based HDL simulator, the signal generators may be created as non-synthesizable HDL components. For a hardware-based HDL simulator, the signal generators are implemented on the hardware. For FPGA-based simulators, the signal generators may use the general fabric resources of the FPGA as well as dedicated components (e.g., DLLs and BUFG muxes) to schedule clock and clock enable pulses under software control.

In one embodiment, the HLMS may have a clock, which is used to synchronize events for the top-level HDL components. The sub-components of the top HDL component may execute asynchronously, as long as the associated top level HDL component operates synchronously with the other HLMS components. In another embodiment the HLMS is event driven. An HLMS event may trigger one or more top level HDL components. And each HDL top level component has one or more HDL events that trigger the HDL top level's sub-components.

Figures 1, 4:
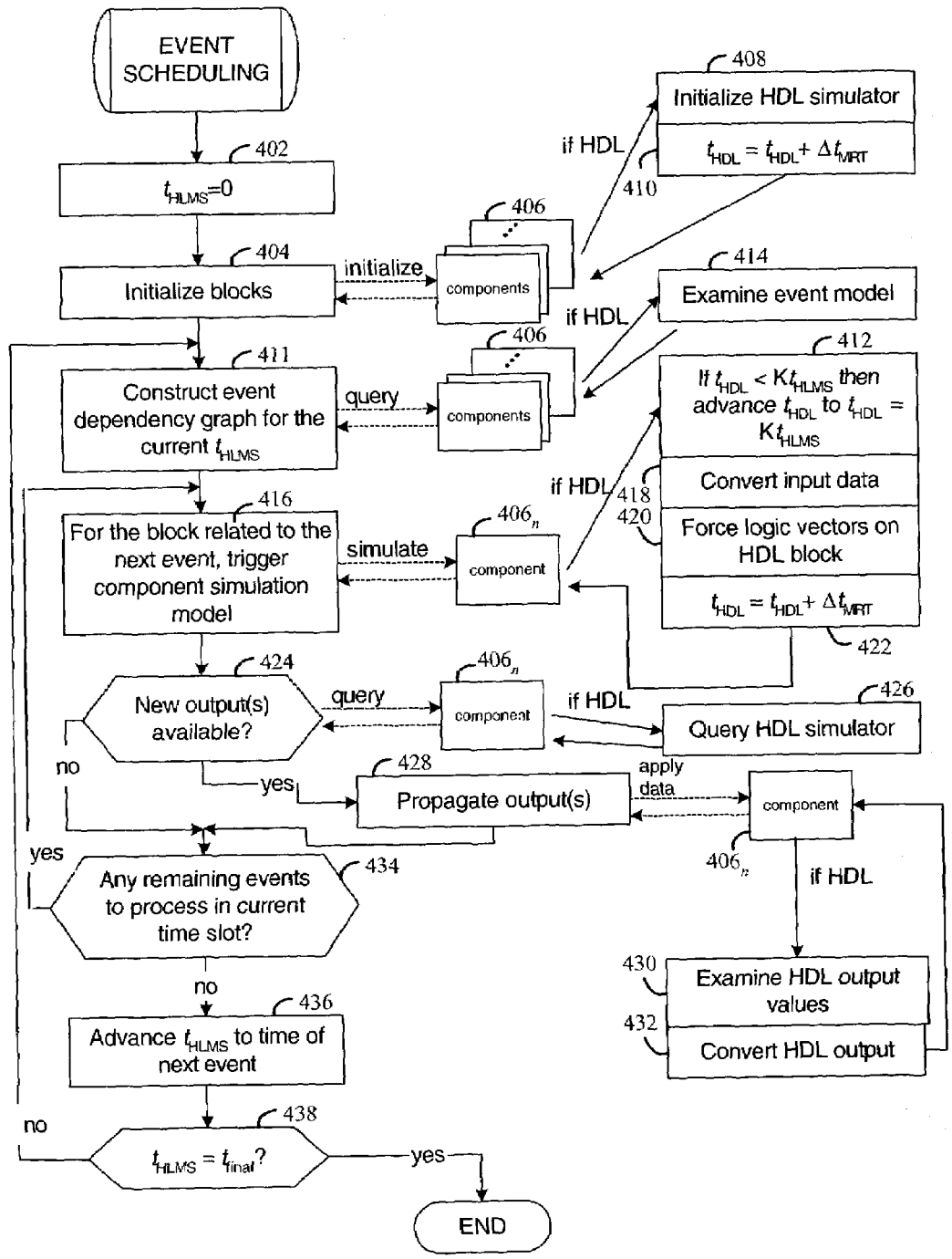
Figures 2, 4:
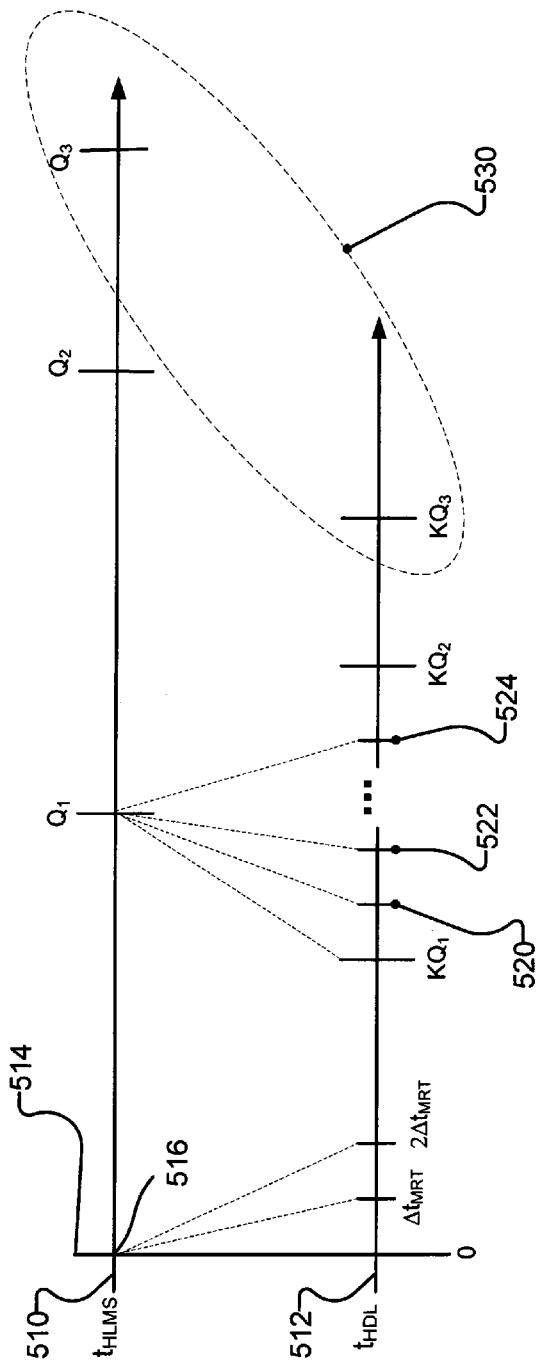
Figures 3, 4:
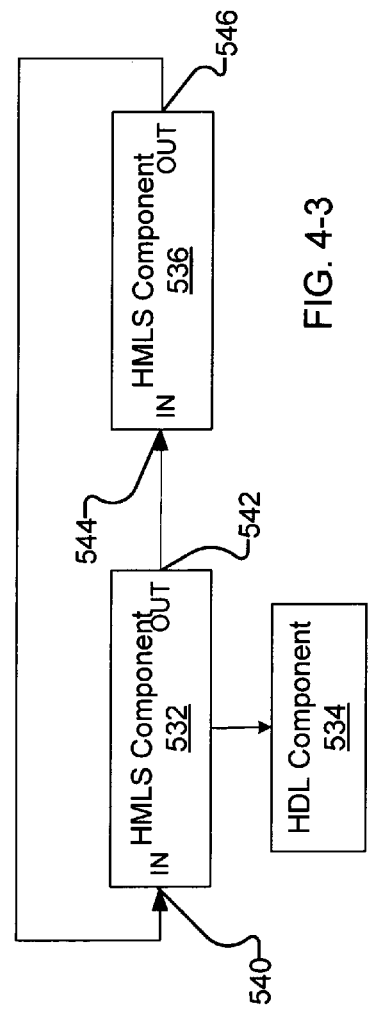

FIG. 4-1 illustrates a process flow in scheduling simulation events between the HLMS and the HDL simulator. The scheduling of events for the HDL simulator is a function of the maximum response time, T, of the HDL component(s) and the time interval for an HMLS event, for example, the minimum time between HLMS events. FIG. 4-1 is explained in conjunction with an example given in FIGS. 4-2 and 4-3.

FIG. 4-2 shows examples of a HLMS timeline and a HDL timeline. Timeline 510 shows the HLMS time ($t_{HLMS}$), associated with an HLMS event occurring in the HLMS, e.g., a new input value to the HLMS. Examples of times $t_{HLMS}$: 0, $Q_1$, $Q_2$, and $Q_3$ for the first four HLMS events are shown, where $t_{HLMS}$ starts at time 0 (vertical line 514). The time interval between each event is given by $\Delta Q$ or $\Delta Q_1$, for example, the time internal between $Q_2$ and $Q_1$ being $\Delta Q_2 = (Q_2 - Q_1)$. In one embodiment $t_{HLMS}$ advances by a fixed time period $\Delta Q$, i.e., $t_{HLMS} = t_{HLMS} + \Delta Q$, after each HLMS event. For example, $t_{HLMS}$ advances to $Q_1$ and $Q_2$ in FIG. 4-2 (where the times in circled area 530 for $Q_3$ are absent). In an alternative embodiment $t_{HLMS}$ is the time associated with each HLMS event, hence the $t_{HLMS}$ time intervals may not be the equal. For example $t_{HLMS}$ advances to $Q_1$, $Q_2$, and $Q_3$ in FIG. 4-2.

In FIG. 4-2 timeline 512 shows the HDL time ($t_{HDL}$) associated with a HDL event occurring in a HDL component, typically the top-level HDL component. The times ($t_{HLMS}$) in timeline 510 are proportionally related to the times ($t_{HDL}$) in timeline 512, where the constant of proportionality is K. Thus $t_{HDL}=K*t_{HLMS}$ and the corresponding times for $Q_1$, $Q_2$, and $Q_3$ in timeline 510 are $KQ_1$, $KQ_2$, and $KQ_3$ in timeline 512.

FIG. 4-3 is an example of a HLMS having a HDL component connected to a HLMS component. A HLMS component 532 having HDL component 534 is connected to HLMS component 536 (with no HDL component), i.e., output 542 of HLMS component 532 is connected to input 544 of HLMS component 536. HLMS component 536 is connected to HLMS component 534, i.e., the output 546 of HLMS component 536 is feedback to input 540 of HLMS component 532.

All clock signal periods and clock enable signal periods are scaled on the order of $T_1$, where $T_1 >> T$. For certain HDL simulators, e.g., for hardware platform based engines, $T_1$ may be chosen instead in terms of arbitrary external time scales (e.g., related to the HLMS simulation process). For example $T_1$ may be set to KQ in FIG. 4-2. The clock and clock enable signals may also be generated via processes that do not produce regular, periodic signals. For HDL simulators that can construct and display waveforms for the designer, for example, the ModelSim simulator, it is desirable to choose a $T_1$ that can be related to the HLMS simulation and also to generate all clock and clock-like clock enable signals such that they are seen as cyclic signals (and appropriately related one to another) within the HDL simulator. This is accomplished by creating signal generation entities as non-synthesizable HDL (e.g., clock signal generator 120, FIG. 1) and by having those signals generated in terms of absolute time, parameterized by the time scale $T_1$ (see FIG. 5).

In the example embodiment, the user identifies to the HLMS the combinational logic paths through the HDL component(s) by specifying all input-output pairs for which a change to the state of the input signal causes a change in the output signal state, even if all clock signals are held constant.

The process flow of FIG. 4-1 generally depicts operations of an HLMS master event scheduler on the left side of the diagram, the components that are connected via dashed lines to the operations on the left represent components in the design being simulated, and blocks 408, 410, 414, 412, 418, 420, 422, 426, 430, and 430 on the right represent operations performed in interfacing with the HDL simulator. The timing variable $t_{HLMS}$ is used in scheduling events in the HLMS, and is initially set to 0 at the beginning of the simulation (step 402).

The components 406 of the design are initialized (step 404) prior to beginning the simulation. Example initialization actions include setting the values of storage elements to known values. For components that are HDL-based components, the HDL simulator is also initialized (step 408), and the HDL simulator current time, $t_{HDL}$, is initially set to zero and as the initial inputs to the HDL component are processed the simulator time, $t_{HDL}$, is advanced by one or more values of $\Delta t_{MRT}$, where $T <= \Delta t_{MRT} << T_1$ (step 410). The $\Delta t_{MRT}$ value represents a quantity of time in the HLMS simulator that is greater than or equal to the maximum response times of the HDL components. In one embodiment $\Delta t_{MRT}$ is a constant quantity of time in the HLMS simulator that is greater than or equal to all the maximum response times of the top level HDL components. In another embodiment $\Delta t_{MRT}$ is different for each top level HDL components.

The reason that $t_{HDL}$ may advance by more than one $\Delta t_{MRT}$ can be explained using FIGS. 4-2 and 4-3. In FIG. 4-2 during initialization, $t_{HDL}$ advances to $\Delta t_{MRT}$, then to $2\Delta t_{MRT}$. From FIG. 4-3 HLMS component 532 having HDL component 534 takes input 540 and transforms it to output 542 within $\Delta t_{MRT}$. Hence $t_{HDL}$ is advanced from 0 to $\Delta t_{MRT}$ (note $t_{HLMS}$ does not advance, as no time is used from the HLMS viewpoint). The output 542 is then input into HLMS component 536, which produces an output 546 in ideally no time in the HLMS timescale. Hence $t_{HLMS}$ does not advance (this is shown by point 516 on timeline 510 associated with $\Delta t_{MRT}$ on timeline 512). Input 540, output 542, input 544, and output 546 may represent bundles of signals or logic vectors, where a change in an input bundle/vector, or an element thereof, may affect a change in an output bundle/vector, or an element thereof. Since output 546 is feedback to input 540, the HLMS component 532 having HDL component 534 takes new input 540 and transforms it to new output 542 within $\Delta t_{MRT}$. Hence $t_{HDL}$ is advanced from $\Delta t_{MRT}$ to $2\Delta t_{MRT}$ (note $t_{HLMS}$ does not advance). The feedback loop may be iterated until stability is obtained.

An event dependency graph is constructed (step 411) to specify the order of component execution for the current time period, $t_{HLMS}$. To construct the dependency graph, the HLMS and HDL components are queried to determine the component events and the order in which the component events are to be issued in the simulation. For HLMS based components, the events are HLMS component events (as opposed to HLMS events) ideally taking no time on the $t_{HLMS}$ timeline to execute. For HDL-based components, the HDL event model is examined to determine the events (step 414). The event sequence might alternatively be determined by examining the HDL code.

For the component $406_n$ that is related to the next event to process, simulation of that component is triggered (step 416). If the component is HDL-based, steps 412, 418, 420, and 422 are performed. Step 412 checks whether the HDL simulator time, $t_{HDL}$, is less than $Kt_{HLMS}$, where K is a constant selected to scale the periods of all the HDL clock signals on the order $T_1$, where $T_1 >> T$. If $T_{HDL} < Kt_{HLMS}$, then $t_{HDL}$ is advanced to $t_{HDL}=Kt_{HLMS}$. Example advancements of $t_{HDL}$ are shown as $KQ_1$, $KQ_2$, and $KQ_3$ in FIG. 4-2. It will be appreciated that $t_{HDL}$ is advanced by this large HLMS-related increment (step 412) only once while processing events within an HLMS timeslot, but is advanced by $\Delta t_{MRT}$ for each event processed within the HLMS timeslot.

The input data from the HLMS is converted to a logic vector(s) for the HDL simulator (step 418), and the logic vector(s) is forced on the HDL component (step 420). The current time of the HDL simulator ($t_{HDL}$) is then advanced by $\Delta t_{MRT}$, where $T <= \Delta t_{MRT} << T_1$ (step 422).

In another embodiment, events to the HDL simulator may be queued instead of activating the HDL simulator with each new event. That is, events to the HDL simulator are queued, and the HDL simulator is activated only at the time the HLMS requires output data from the HDL simulator. This serves to minimize the interaction between the HLMS and the HDL simulator and decrease the time required for simulation.

After simulating the component (step 416), the process checks whether a new output data or logic vector(s) is available (step 424) by querying the component $406_n$. If the component is HDL-based, the HDL simulator is queried for new output data. If data are available, the data are obtained from the component $406_n$ and then propagated (step 428) to the HLMS components. If the component is HDL-based, the logic vector(s) output from the HDL simulator are examined (step 430) and converted to the data type appropriate for the HLMS simulator (step 432).

As long as there remain events to process in the current timeslot, the process returns to process the next event (step 434). For example, for $Q_2$ on timeline 510 or $KQ_2$ on timeline 512 of FIG. 4-2, after time 520, there are still HDL events at times 522 to 524, that need to processed. Once all the events in the current timeslot have been processed, $t_{HLMS}$ is advanced to the time of the next event, e.g., $Q_2$, (step 436).

In an example embodiment, K is selected (for the design under simulation) to be large enough to account for the minimum period between HLMS events, e.g., in the example of FIG. 4-2, $(Q_3-Q_2)$, and an expected maximum number of HLMS-triggered events to be processed by the HDL simulator in any one HLMS timeslot. More specifically, K is chosen such that $K^*\Delta Q_{min} > N^*\Delta t_{HLMS}$, where $\Delta Q_{min}$ is a minimum period of time between HLMS events, and N is the expected maximum number of HDL events to be processed by the HDL simulator in any one HLMS timeslot. The term $K^*\Delta Q$ is the minimum time interval on the $t_{HLMS}$ timeline scaled by the proportionality factor K. The term $N^*\Delta t_{HLMS}$, is the maximum number of sequential $\Delta t_{HLMS}$ that can occur in any one HLMS timeslot. The time intervals $K^*\Delta Q$ on the $t_{HDL}$ timeline are chosen to accommodate the worst case number of iterations of the HDL component in a HLMS timeslot.

If $t_{HLMS} = t_{final}$ (where $t_{final}$ designates the end of the simulation), then the simulation is complete (step 438). Otherwise, the process continues at step 411.

FIG. 5 illustrates an example HDL clock signal generator produced from HDL components that are to be simulated. The clock signal generator is implemented as a VHDL entity that produces four such signals. In the example code, $T_1=1$ second, and a clock signal is stepped at the corresponding frequency (1Hz) along with the clock enable patterns used to gate portions of the circuit to run at one-half and one-quarter rates. The clock signal generator is automatically generated by way of analysis of an HDL component that is to be clocked during simulation.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for simulating electronic circuit designs and has been found to be particularly applicable and beneficial in simulating in a high-level modeling system the high-level components of a design and co-simulating HDL components of the design. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for simulating operations of a circuit design that includes high-level components and one or more HDL components, comprising:

simulating the high-level components of the design in a high-level modeling system (HLMS);

co-simulating the one or more HDL components of the design with an HDL simulator;

converting a data value from a data type of the HLMS to a logic vector compatible with the HDL simulator for each data value to be input to the HDL simulator;

converting a logic vector from the HDL simulator to a data value of a data type compatible with the HLMS for each logic vector output from the HDL simulator;

maintaining an HLMS current time and an HDL simulator current time, wherein each unit of HLMS time corresponds to K units of HDL simulator time, and K satisfies the inequality $K^*\Delta Q > N^*\Delta t_{MRT}$, where $\Delta Q$ is a selected minimum period of time between HLMS events, N is an expected maximum number of events of the HDL simulator in any one HLMS timeslot, and $\Delta t_{MRT}$ is greater than a maximum response time of at least one HDL component; and scheduling an event for the HDL simulator as a function of $\Delta Q$ and $\Delta t_{MRT}$.

2. The method of claim 1, wherein the HDL components support a set of signal states, the method further comprising:

implementing a set of states for each data type of the high-level components, one or more of the sets of states including a non-representable state;

for states of a set of output signals of the HDL components that are representable as a data value in the high-level components, setting an output data value to a value corresponding to the states of the set of output signals;

for states of a set of output signals of the HDL components that are not representable as a data value in the high-level components, setting the output data value to a non-representable state; and propagating non-representable states of data values in simulating the high-level components.

3. The method of claim 2, further comprising:

translating states of the output signals to a translated set of states according to a map of the set of HDL signal states to a set of intermediate states; and setting the output data value to a non-representable state if the state of at least one signal in the translated set of states is equal to a predetermined value.

4. The method of claim 3, wherein the map is user-definable.

5. The method of claim 2, further comprising:

translating states of the output signals to a translated set of states according to a map of the set of HDL signal states to a set of intermediate states; and signaling an error to the HLMS if the state of at least one signal in the translated set of states is equal to a predetermined value.

6. The method of claim 5, wherein the map is user-definable.

7. The method of claim 2, further comprising:

translating states of the output signals to a translated set of states according to a map of the set of HDL signal states to a set of intermediate states; and converting the translated set of states to an output value if the states of the signals in the translated set of states are representable as a data value in the HLMS.

8. The method of claim 7, wherein the map is user-definable.

9. The method of claim 2, further comprising if a data value to be input to the HDL simulator is in a non-representable state, setting states of elements in a logic vector to an analogous signal state.

10. The method of claim 9, further comprising if the HDL simulator has no signal state analogous to the non-representable state of the data value, signaling an error to the HLMS.

11. The method of claim 9, further comprising:
translating states of the output signals to a translated set of states according to a map of the set of HDL signal states to a set of intermediate states; and
setting the output data value to a non-representable state if the state of at least one signal in the translated set of states is equal to a predetermined value.

12. The method of claim 9, further comprising:
translating states of the output signals to a translated set of states according to a map of the set of HDL signal states to a set of intermediate states; and
signaling an error to the HLMS if the state of at least one signal in the translated set of states is equal to a predetermined value.

13. The method of claim 9, further comprising:
translating states of the output signals to a translated set of states according to a map of the set of HDL signal states to a set of intermediate states; and
converting the translated set of states to an output value if the states of the signals in the translated set of states are representable as a data value in the HLMS.

14. The method of claim 1, further comprising generating one or more HDL clock signal generators and coupling the HDL clock signal generators to the one or more HDL components.

15. The method of claim 1, further comprising:
maintaining an HLMS current time and an HDL simulator current time; and
selectively advancing the HDL simulator current time on a plurality of timescales, wherein at least a first one of the timescales is a function of the maximum response time of the HDL components, and at least a second one of the timescales is a function of the maximum response time and a maximum number of events queued to the HDL simulator during an HLMS timeslot.

16. The method of claim 1, further comprising:
advancing the HDL simulator current time by a period of time that is equal or greater than the maximum response time; and
advancing the HLMS current time after processing all events scheduled in an HLMS timeslot and if the HDL simulator current time is less than K times the HLMS current time, then advancing the HDL simulator current time to K times the HLMS current time.

17. The method of claim 16, wherein the HDL components support a set of signal states, the method further comprising:
implementing a set of states for each data type of the high-level components, one or more of the sets of states including a non-representable state;
for states of a set of output signals of the HDL components that are representable as a data value in the high-level components, selling an output data value to a value corresponding to the states of the set of output signals;
for states of a set of signals of the HDL components that are not representable as a data value in the high-level components, setting the output data value to a non-representable state; and
propagating non-representable states of data values in simulating the high-level components.

18. An apparatus for simulating operations of a circuit design that includes high-level components and one or more HDL components, comprising:
means for simulating the high-level components of the design in a high-level modeling system (HLMS);
means for co-simulating the one or more HDL components of the design with an HDL simulator;
means for converting a data value from a data type of the HLMS to a logic vector compatible with the HDL simulator for each data value to be input to the HDL simulator;
means for converting a logic vector from the HDL simulator to a data value of a data type compatible with the HLMS for each logic vector output from the HDL simulator;
means for maintaining an HLMS current time and an HDL simulator current time, wherein each unit of HLMS time corresponds to K units of HDL simulator time, and K satisfies the inequality $K*\Delta Q > N*\Delta t_{MRT}$, where $\Delta Q$ is a selected minimum period of time between HLMS events, N is an expected maximum number of events of the HDL simulator in any one HLMS timeslot, and $\Delta t_{MRT}$ is greater than a maximum response time of at least one HDL component: and
means for scheduling events for input to the HDL simulator as a function of $\Delta Q$ and $\Delta t_{MRT}$.

19. A high level modeling system (HLMS) adapted to co-simulate with an HDL simulator operations of a circuit design that includes high-level components and one or more HDL components, comprising:
a first type converter configured to convert a data value from a data type of the HLMS to a logic vector compatible with the HDL simulator for each data value to be input to the HDL simulator;
a second type converter configured to convert a logic vector from the HDL simulator to a data value of a data type compatible with the HLMS for each logic vector output from the HDL simulator; and
a co-simulation event scheduler configured to maintain an HLMS current time and an HDL simulator current time, wherein each unit of HLMS time corresponds to K units of HDL simulator time, and K satisfies the inequality $K*\Delta Q > N*\Delta t_{MRT}$, where $\Delta Q$ is a selected minimum period of time between HLMS events, N is an expected maximum number of events of the HDL simulator in any one HLMS timeslot, and $\Delta t_{MRT}$ is greater than a maximum response time of at least one HDL component, the scheduler further configured to schedule events for input to the HDL simulator as a function of $\Delta Q$ and $\Delta t_{MRT}$.

20. The system of claim 19, wherein the HDL components support a set of signal states, the system further comprising:
wherein the HLMS is configured to implement a set of states for each data type of the high-level components, one or more of the sets of states including a non-representable state;
the second type converter is further configured to, for states of a set of output signals of the HDL components that are representable as a data value in the high-level components, set an output data value to a value corresponding to the states of the set of output signals;
the second type converter is further configured to, for states of a set of signals of the HDL components that are not representable as a data value in the high-level components, set the output data value to a non-representable state; and
the HLMS is further configured to propagate non-representable states of data values in simulating the high-level components.

21. The system method of claim 20, wherein the first type converter is further configured to, if a data value to be input to the HDL simulator is in a non-representable state, set states of elements in a logic vector to an analogous signal state.

22. A method for simulating operations of a circuit design that includes high-level components and one or more HDL components, comprising:
   simulating the high-level components of the design in a high-level modeling system (HLMS);
   co-simulating the one or more HDL components of the design with an HDL simulator;
   maintaining an HLMS current time and an HDL simulator current time, wherein each unit of HLMS time corresponds to K units of HDL simulator time, and K satisfies the inequality $K*\Delta Q > N*\Delta t_{MRT}$, where $\Delta Q$ is a selected minimum period of time between HLMS events, N is an expected maximum number of events of the HDL simulator in any one HLMS timeslot, and $\Delta t_{MRT}$ is greater than a maximum response time of at least one HDL component; and
   scheduling events for the HDL simulator, the scheduling based on a function of variables, the variables comprising $\Delta Q$ and $\Delta t_{MRT}$.

* * * * *